200 - 2,925,368
Patented Feb. 16, 1960

2,925,368

PRODUCING PERCHLORIC ACID BY IRRADIATION

William A. Sandberg, Oak Park, Ted A. Erikson, Oak Lawn, and Charles H. Riesz, Chicago, Ill., assignors, by mesne assignments, to the United States of America as represented by the Secretary of the Navy No Drawing. Application June 12, 1957
Serial No. 665,361

3 Claims. (Cl. 204—157)

The present invention pertains to the art of producing perchloric acid, and comprises a new process for producing perchloric acid by irradiating a mixture of gaseous ozone and gaseous chlorine in the presence of gaseous water.

Applicants have discovered that the presence of water vapor in the reaction mixture speeds the reaction, and causes the formation of perchloric acid, avoiding the formation of lower chlorine oxides and subsequent lower chlorine acids.

A suitable procedure for practicing the present invention consists of evacuating a reactor, which then is filled with water vapor at its vapor pressure at room temperature, i.e., at 24 millimeters of mercury pressure. Gaseous ozone then is added to the reactor to a pressure of 211 millimeters of mercury pressure. Gaseous chlorine is added to the reactor next, to a total pressure of 396 millimeters of mercury pressure.

A mercury-vapor bulb immersed in the reactor, containing the mixture of chlorine, ozone, and water in gaseous state, is excited with a 27.12 megacycle radio frequency current, by means of a suitable radio frequency generator. A mercury-vapor bulb has been used and is satisfactory, which was rated by the manufacturer to be 85 percent 2537 Angstroms. The remainder of the output of this bulb comprised wavelengths within the range from 1800 Angstroms to 4000 Angstroms, and about 5 percent of the output was in the visible range. The described process of irradiation was continued for three minutes. A halt in pressure increase was observed after the first two minutes of operation, indicating that the reaction was completed in about two minutes.

Following the described step of irradiation, the contents of the reactor was condensed by immersing the reaction vessel in liquid oxygen. The non-condensable material was removed by means of a vacuum pump, leaving perchloric acid as the contents of the reactor.

Pursuing the reaction further, and following the described pumping operation, applicant allowed the material contained in the reactor to evaporate, adding another charge of gaseous ozone to the resultant mixture until a gaseous ozone pressure was attained of 413 millimeters of mercury pressure. This mixture was irradiated again for three minutes. The operation of condensation then was repeated by immersing the reaction vessel in liquid oxygen, and the non-condensed remaining gas was pumped off in the manner previously described.

Production of perchloric acid was verified by flushing out the condensate remaining in the reactor with water, and neutralizing the resultant aqueous solution. Analysis of the neutralized solution yielded 0.0029 gram of sodium chloride and .078 gram of sodium perchlorate.

In the above described process for producing perchloric acid, hydrogen chloride may be substituted for the water and chlorine, although a small amount of gaseous water must be present in any event for hydration. The original ozone may be diluted with oxygen. It is not requisite that the irradiation must be continuous; the irratiation can be interrupted without affecting the reaction.

As established hereinbefore by actual operation, wavelengths within the range between 1800 Angstroms and 4000 Angstroms may be used for the operation of irradiation. Employing wavelengths for irradiation within the limits of 1800 Angstroms and 200 Angstroms, the reaction may be carried out by substituting gaseous oxygen for the gaseous ozone.

Obviously many modifications and variations of the present invention are possible in the light of the above teachings. It is therefore to be understood that within the scope of the appended claims the invention may be practiced otherwise than as specifically described.

We claim:

1. The art of producing perchloric acid which comprises subjecting a mixture of gaseous ozone and gaseous chlorine in the presence of gaseous water to radiation at a wavelength of 2537 Angstroms with permissible wavelength spread between 1800 Angstroms and 400 Angstroms, said water vapor being at its vapor pressure at room temperature, said gaseous ozone being added to a pressure of about 211 millimeters, and said gaseous chlorine being added to a total pressure of about 396 millimeters.

2. In the art as defined in claim 1, substituting oxygen for the ozone in the mixture when it is subjected to radiation at wavelengths limited between 1800 Angstroms and 2000 Angstroms.

3. The process of producing perchloric acid which comprises evacuating a reactor, filling the reactor with water vapor at its vapor pressure at room temperature, adding gaseous ozone to a pressure of about 211 millimeters, adding gaseous chlorine to a total pressure of about 396 millimeters, exciting such gaseous mixture with radiation at a wavelength of 2735 Angstroms with permissible wavelength spread between 1800 Angstroms and 4000 Angstroms until reaction abates, and condensing the product by immersing the reaction vessel in liquid oxygen.

References Cited in the file of this patent

UNITED STATES PATENTS

| | | |
|---|---|---|
| 523,263 | Cannot | July 17, 1894 |
| 2,689,217 | Cotton | Sept. 14, 1954 |
| 2,762,768 | Cier | Sept. 11, 1956 |